United States Patent
Kobayashi et al.

(10) Patent No.: US 7,255,843 B2
(45) Date of Patent: Aug. 14, 2007

(54) LOW VISCOSITY-INCREMENT FUMED-SILICA AND ITS SLURRY

(75) Inventors: Hitoshi Kobayashi, Yokkaichi (JP); Masamichi Murota, Yokkaichi (JP); Hirokuni Shirono, Yokkaichi (JP)

(73) Assignee: Nippon Aerosil Co., Ltd., Tokyo (JP)

( * ) Notice: Subject to any disclaimer, the term of this patent is extended or adjusted under 35 U.S.C. 154(b) by 485 days.

(21) Appl. No.: 10/326,542

(22) Filed: Dec. 23, 2002

(65) Prior Publication Data

US 2003/0124045 A1    Jul. 3, 2003

(30) Foreign Application Priority Data

Dec. 28, 2001    (JP) .............................. 2001-400071

(51) Int. Cl.
*C01B 33/14* (2006.01)
*C09C 1/28* (2006.01)
*C09D 17/00* (2006.01)

(52) U.S. Cl. ................ 423/335; 423/336; 423/337; 106/3; 106/31.13; 106/287.34; 106/482; 51/309

(58) Field of Classification Search ................ 423/335, 423/337, 336; 106/31.13, 3, 287.34, 482; 451/41; 51/309; 428/32.34
See application file for complete search history.

(56) References Cited

U.S. PATENT DOCUMENTS

| | | | | | |
|---|---|---|---|---|---|
| 4,208,316 | A | * | 6/1980 | Nauroth et al. | 524/789 |
| 4,356,116 | A | * | 10/1982 | Beers | 524/837 |
| 4,454,288 | A | * | 6/1984 | Lee et al. | 524/588 |
| 4,874,518 | A | * | 10/1989 | Kirkland et al. | 210/502.1 |
| 4,985,477 | A | * | 1/1991 | Collins et al. | 523/212 |
| 5,342,597 | A | * | 8/1994 | Tunison, III | 423/335 |
| 5,776,240 | A | * | 7/1998 | Deller et al. | 106/482 |
| 5,897,675 | A | * | 4/1999 | Mangold et al. | 51/309 |
| 6,077,640 | A | | 6/2000 | Komai et al. | |
| 6,193,795 | B1 | * | 2/2001 | Nargiello et al. | 106/484 |
| 2002/0077388 | A1 | * | 6/2002 | Meyer et al. | 523/216 |
| 2002/0177311 | A1 | * | 11/2002 | Schumacher et al. | 438/689 |
| 2003/0094593 | A1 | * | 5/2003 | Hellring et al. | 252/79.1 |
| 2003/0140657 | A1 | * | 7/2003 | Oswald et al. | 65/391 |

* cited by examiner

*Primary Examiner*—Ngoc-Yen Nguyen
(74) *Attorney, Agent, or Firm*—Oblon, Spivak, McClelland, Maier & Neustadt, P.C.

(57) ABSTRACT

A fumed-silica, which can make a slurry having sufficient wettability to a polar liquid, excellent dispersibility, and low viscosity even in the high concentration, and a slurry thereof. A fumed-silica and its slurry are provided, wherein the water content is controlled so that a weight loss after drying Y, and a dynamic wetting rate to water Z, have specified values.

24 Claims, No Drawings

LOW VISCOSITY-INCREMENT FUMED-SILICA AND ITS SLURRY

BACKGROUND OF THE INVENTION

1. Field of the Invention

The present invention relates to a low viscosity-increment fumed-silica and a slurry thereof. The fumed-silica may be used as a component of a chemical-mechanical polishing (CMP), a coating material, a printing ink, an adhesive, a sealant, and an ink-jet recording paper etc., and can also be used to prepare a silica slurry having high flowability and dispersibility even at a high concentration of silica in the slurry.

2. Description of the Background

Fumed-silica is classified as a silicic acid anhydride, has small absorption ability for water content, and is used for the purpose of increasing the viscosity of a liquid. In addition, the fumed silica has an advantage of being able to increase the viscosity of a solution with the addition of only a small amount. However, when the fumed-silica is used at a high concentration with slurry, there is a problem in the dispersibility since the viscosity-increment is too high. Accordingly, there remains a need for fumed-silica which overcomes this difficulty.

SUMMARY OF THE INVENTION

The present invention solves the problem associated with the conventional fumed-silica discussed above, and provides a fumed-silica, which can be used to make the slurry having excellent dispersibility, sufficient wettability to a polar liquid, and low viscosity-increment even in the high concentration, by absorbing water uniformly and compulsorily on the surface of the fumed-silica without existing aggregated particles. The present invention also provides a slurry of the inventive fumed-silica.

Thus, the present invention relates to the low viscosity-increment fumed-silica and a slurry thereof, as described below.

In one embodiment, the present invention provides a fumed-silica, wherein the water content is controlled so that a weight loss after drying at 105° C. for 2 hours, Y, is as indicated in the following formula (i):

$$Y \geq 0.0104X - 0.01 \quad \text{(i)}$$

where, $Y \leq 10$ and X is the specific surface area of 50-400 m²/g by the BET method.

In another embodiment, the present invention provides a fumed-silica, wherein the water content is controlled so that a dynamic wetting rate to water, Z, is as indicated in the following formula (ii):

$$Z(\times 10^{-5} N/s) \geq -0.0162x + 9.2 \quad \text{(ii)}$$

wherein X is as described above.

In another embodiment, the present invention provides a fumed-silica, wherein the weight loss after drying is more than 2% to less than 10%, and the dynamic wetting rate to water is more than 5 ($\times 10^{-5}$ N/s).

In addition, the present invention provides a silica slurry containing the fumed-silica described above, in which the concentration of the silica is more than 10% by weight.

In one embodiment, the silica slurry viscosity at shearing rate of 100 s⁻¹ is less than 50 mPa·s in a standard range of pH and a silica concentration.

In one embodiment, the silica does not precipitate after seven days at room temperature from the silica slurry described above.

The present invention also provides a method of preparing the fumed-silica described above, comprising controlling the water content of a fumed-silica such that the resulting fumed-silica satisfies the parameters described above.

The present invention also provides a method of preparing the slurry described above, comprising combining the fumed-silica of the present invention with water.

The present invention also provides a chemical-mechanical polishing, a coating material, a printing ink, an adhesive, a sealant, or an ink-jet recording paper, comprising the fumed-silica described above.

Regarding the fumed-silica of the present invention, the aggregation of the particle is controlled with increasing the wettability to the liquid, i.e., water, by controlling the water content so that the weight loss after drying and the dynamic wettability are in the predetermined range described above. Specifically, it is preferable that the water content is controlled, so that the weight loss after drying Y is more than 2% to less than 10%, and the dynamic wetting rate to water Z is more than 5 ($\times 10^{-5}$ N/s). Using the fumed-silica of the present invention, it is possible to obtain the slurry having low viscosity-increment, in which the dispersibility is excellent in the solution. When the fumed-silica is used to make the silica slurry, in which pH and the silica concentration are in the standard range, i.e., pH is 3 to 5, and the silica concentration is more than 10%, it is possible to obtain the low viscosity slurry, in which the viscosity at the shearing rate of 100 s⁻¹ is less than 50 mPa·s. Furthermore, when the silica slurry is stored for seven days at room temperature, the silica does not precipitate.

A more complete appreciation of the invention and many of the attendant advantages thereof will be readily obtained as the same becomes better understood by reference to the following detailed description.

DETAILED DESCRIPTION OF THE INVENTION

As discussed above, the fumed-silica of the present invention has a water content which is controlled so that the weight loss after drying at 105° C. for 2 hours, Y, is as indicated in the following formula (i), and the dynamic wetting rate to water Z is as indicated in the following formula (ii). In addition, the weight loss after drying Y is the ratio (%) of the silica weights before and after drying, wherein said drying is done, for example, at 105° C. for 2 hours.

$$Y \geq 0.0104X - 0.01 \quad \text{(i)}$$

where, $Y \leq 10$ and X is the specific surface area of 50-400 m²/g by the BET method.

$$Z(\times 10^{-5} N/s) \geq -0.0162X + 9.2 \quad \text{(ii)}$$

Y may be at most 5, 8, or 9. In one embodiment, Y is from 2 to 9.

The range for X specified above includes all specific values and subranges therebetween, such as 75, 100, 150, 200, 250, 300, and 350 m²/g, and the specific ranges of 50-200 m²/g or 200-400 m²/g.

When the weight loss after drying Y is less than the value indicated in the formula (i), the wettability of the fumed-silica to the liquid, i.e., water, is low, so that the fumed-silica remains on the surface of the liquid for a long time, and the aggregation of the silica is formed on the surface of the liquid to be gelled. So, it is difficult to disperse fully in the liquid, and therefore, the viscosity of the slurry becomes high, and the silica is precipitated gradually with the passage of time since the silica is not dispersed fully. Moreover, when the value of the weight loss after drying Y is high, the dynamic wettability Z generally becomes high. However, when the weight loss after drying Y is more than 10%, although the wettability to the liquid is improved and the viscosity of the slurry becomes low, the silica itself has the superfluous water content, so that the silica particle changes from the micro aggregation to the big and rough aggregation to be the state, where the dispersibility in the liquid is remarkably low. Therefore, at this case, the silica becomes to precipitate with the passage of time.

The dynamic wetting rate to water Z ($\times 10^{-5}$ N/s) is the value, which is the index of the wettability of the fumed-silica to the liquid, i.e., water, and it means that the wetting time to the liquid is so short that the value is high.

Regarding the fumed-silica, in which the water content is not controlled, when the specific surface area by the BET method becomes large, that is, the primary particle size becomes small, the wettability to the liquid becomes low, the wetting time becomes long, and the value of the dynamic wetting rate becomes small in general. In addition, by absorbing the suitable amount of water on the surface of the fumed-silica uniformly without forming the silica aggregation, it becomes possible to improve the wettability or the dynamic wetting rate to the liquid.

When the dynamic wetting rate Z is less than the value indicated in the formula (ii), the wetting time is long because the wettability is low. As a result, the silica aggregation is formed on the surface of the liquid to be gelled, and it becomes difficult to disperse fully. In such a state, where an aggregation structure of the silica exists, the viscosity of the liquid becomes high, and the silica is not dispersed fully, so that the silica aggregation precipitates with the passage of time.

Regarding the fumed-silica of the present invention, it is preferable that, for example, the weight loss after drying Y is more than 2% to less than 10%, and the dynamic wetting rate to water Z is more than 5 ($\times 10^{-5}$ N/s), as shown in the Examples. When the weight loss after drying Y is less than 2%, the dynamic wetting rate to water Z is also less than 5 ($\times 10^{-5}$ N/s) in general, and the viscosity becomes high remarkably at the time of making slurry. On the other hand, when the weight loss after drying Y is more than 10%, the aggregation of the silica precipitates with the passage of time even if the viscosity of the slurry is low. In order to make the weight loss after drying Y and the dynamic wetting rate to water Z in said range, the fumed-silica is controlled at the temperature condition, in which said fumed-silica does not dew in the closing system having more than 20% of the relative humidity.

Thus, the weight loss after drying of the fumed-silica described above is more than 2% but less than 10%. This range includes all specific values and subranges therebetween, such as more than 2% to less than 8%.

Regarding the fumed-silica, in which the water content is controlled so that the weight loss after drying Y and the dynamic wetting rate to water Z become in said range, it is possible to obtain the low viscosity silica slurry having the viscosity of less than 50 mPa·s at the shearing rate of 100 $s^{-1}$, in the silica slurry, where pH and the silica concentration are in the standard range, i.e., for example, pH is 3 to 5, and the silica concentration is more than 10%. In addition, when said slurry was stored seven days at room temperature, the silica does not precipitate.

The fumed-silica of the present invention may be used as a component of any of the compositions of matter which customarily contain fumed-silica. For example, the fumed-silica of the present invention may be used as a component of a chemical-mechanical polishing (CMP), a coating material, a printing ink, an adhesive, a sealant, and an ink-jet recording paper etc. Methods of preparing such compositions are well-known to those skilled in the art.

EXAMPLES

Hereafter, the present invention is explained with the examples, which are provided herein for purposes of illustration only and are not intended to be limiting unless otherwise specified, and comparative examples. Moreover, the measuring methods of the weight loss after drying, the specific surface area, the viscosity, and the dynamic wetting rate, and the preparing method of the silica slurry, are the followings. These results are shown in Table 1.

Weight Loss After Drying 1 g of the silica fine powder was sampled in a measuring bottle, and the powder was dried at 105° C. for 2 hours to measure the weight. Next, the ratio of the weight loss (%) before and after drying was calculated to be the amount of the absorbed water content.

Specific Surface Area by the BET Method

The specific surface area was measured by the vapor phase absorption method. In this method, a gas molecule, which was nitrogen molecule and the occupied area was already known, was absorbed on the surface of the silica fine powder, to obtain the specific surface area from the absorption amount of the gas molecule. The measuring apparatus was SA1100 made by Shibata Kagaku Kikai Kogyo Co.

Viscosity of the Slurry

The viscosity was measured in a double cylindrical pipe at the temperature condition of 22° C. and the shearing rate of 100 $s^{-1}$, by using a rheometer made by HAAKE Co. (RheoStress RS150).

Dynamic Wetting Rate

The dynamic wetting rate was measured by using a dynamic wettability testing machine made by RHESCA Co. (WET-6100), which measures dynamically the interface properties between a solid and a liquid by the Wilhelm method, that is, measuring a change with the passage of time and a relative position change between a solid and a liquid. Specifically, the silica powder was taken into the glass pipe, in which the bottom was sealed with a mesh. Next, this pipe was dipped perpendicularly in the liquid to be stopped when the bottom was just dipped. The weight of the liquid, which was permeated and raised into the silica through the mesh during the predetermined time, was measured by an electronic balance. The dynamic wetting rate (N/s) was calculated from the weight of the liquid after 20 seconds of said permeating time.

Preparing Method of the Slurry 180 g of the pure water was measured with a beaker (500 ml), and 20 g of the silica was taken into the beaker. The silica was stirred for 30 minutes at 5000 rpm to be dispersed, by using high speed vane type dispersion equipment (Dispermat) made by VMA-GETZMANN GmbH Co. Then, the silica slurry was prepared. Moreover, pH of the slurry was adjusted arbitrarily using nitric acid or acetic acid to the acidity side, and using potassium hydroxide or ammonium hydroxide to the alkali side.

Example 1

3.6 kg/h of steam, 87 Nm$^3$/h of dry air for carrying the silica, and 140 kg/h of the fumed-silica having the specific surface area of 200 m$^2$/g by the BET method (Aerosil 200), were introduced into the pipe kept at 65° C. to be circulated in the pipe until the absorbed water content reached equilibrium. At this time, the relative humidity in the pipe was 22%. The weight loss after drying of the fumed-silica prepared by said method was 2.6%, and the dynamic wetting rate was 6.20 ($\times 10^{-5}$ N/s). Next, when 12 weight % of said silica was added to pure water to prepare the silica slurry by stirring to be dispersed, pH was 4.0. Moreover, when the viscosity of the slurry was measured, the viscosity being in the stable state at the shearing rate of 100 s$^{-1}$ was 35 mPa·s. In addition, when the slurry was put seven days at room temperature, the silica did not precipitate.

Example 2

5.4 kg/h of the steam, 42 Nm$^3$/h of the dry air for carrying the silica, and 140 kg/h of the fumed-silica having the specific surface area of 310 m$^2$/g by the BET method (Aerosil 300), were introduced into the pipe kept at 80° C. to be circulated in the pipe until the absorbed water content reached equilibrium. At this time, the relative humidity in the pipe was 30%. The weight loss after drying of the fumed-silica prepared by said method was 3.8%, and the dynamic wetting rate was 7.32 ($\times 10^{-5}$ N/s). Next, when 12 weight % of said silica was added to the pure water to prepare the silica slurry by stirring to be dispersed, pH was 3.9. Moreover, when the viscosity of the slurry was measured, the viscosity being in the stable state at the shearing rate of 100 s$^{-1}$ was 42 mPa·s. In addition, when the slurry was put seven days at room temperature, the silica did not precipitate.

Example 3

3.6 kg/h of the steam, 87 Nm$^3$/h of the dry air for carrying the silica, and 80 kg/h of the fumed-silica having the specific surface area of 86 m$^2$/g by the BET method (Aerosil 90), were introduced into the pipe kept at 50° C. to be circulated in the pipe until the absorbed water content reached equilibrium. At this time, the relative humidity in the pipe was 40%. The weight loss after drying of the fumed-silica prepared by said method was 4.2%, and the dynamic wetting rate was 9.66 ($\times 10^{-5}$ N/s). Next, when 16 weight % of said silica was added to the pure water to prepare the silica slurry by stirring to be dispersed, pH was 4.4. Moreover, when the viscosity of the slurry was measured, the viscosity being in the stable state at the shearing rate of 100 s$^{-1}$ was 24 mPa·s. In addition, when said slurry was put seven days at room temperature, the silica did not precipitate.

Example 4

10 kg/h of the steam, 114 Nm$^3$/h of the dry air for carrying the silica, and 110 kg/h of the fumed-silica having the specific surface area of 200 m$^2$/g by the BET method (Aerosil 200), were introduced into the pipe kept at 50° C. to be circulated in the pipe until the absorbed water content reached equilibrium. At this time, the relative humidity in the pipe was 50%. Moreover, the weight loss after drying of the fumed-silica prepared by said method was 8.6%, and the dynamic wetting rate was 8.72 ($\times 10^{-5}$ N/s). Next, when 12 weight % of the silica was added to the pure water to prepare the silica slurry by stirring to be dispersed, pH was 4.2. Moreover, when the viscosity of the slurry was measured, the viscosity being in the stable state at the shearing rate of 100 s$^{-1}$ was 28 mPa·s. In addition, when the slurry was put seven days at room temperature, the silica did not precipitate.

Example 5

3.6 kg/h of the steam, 87 Nm$^3$/h of the dry air for carrying the silica, and 80 kg/h of the fumed-silica having the specific surface area of 54 m$^2$/g by the BET method (Aerosil 50), were introduced into the pipe kept at 50° C. to be circulated until the absorbed water content reached equilibrium. At this time, the relative humidity in the pipe was 40%. Moreover, the weight loss after drying of the fumed-silica prepared by said method was 3.6%, and the dynamic wetting rate was 10.8 ($\times 10^{-5}$ N/s). Next, when 20 weight % of said silica was added to the pure water to prepare the silica slurry by stirring to be dispersed, pH was 4.6. Moreover, when the viscosity of the slurry was measured, the viscosity being in the stable state at the shearing rate of 100 s$^{-1}$ was 28 mPa·s. In addition, when said slurry was put seven days at room temperature, the silica did not precipitate.

Example 6

5.4 kg/h of the steam, 42 Nm$^3$/h of the dry air for carrying the silica, and 120 kg/h of the fumed-silica having the specific surface area of 386 m$^2$/g by the BET method (Aerosil 380), were introduced into the pipe kept at 80° C. to be circulated in the pipe until the absorbed water content reached equilibrium. At this time, the relative humidity in the pipe was 30%. Moreover, the weight loss after drying of the fumed-silica prepared by said method was 4.2%, and the dynamic wetting rate was 5.88 ($\times 10^{-5}$ N/s). Next, when 12 weight % of said silica was added to the pure water to prepare the silica slurry by stirring to be dispersed, pH was 4.0. Moreover, when the viscosity of the slurry was measured, the viscosity being in the stable state at the shearing rate of 100 s$^{-1}$ was 46 mPa·s. In addition, when said slurry was put seven days at room temperature, the silica did not precipitate.

Example 7

Regarding the fumed-silica (Aerosil 200), in which the water content was controlled in Example 1, pH was adjusted to 3.2 with nitric acid to measure the dynamic wetting rate. Moreover, the silica slurry having the concentration of 16% was prepared to be measured its viscosity. At this time, the dynamic wetting rate was 7.43 ($\times 10^{-5}$ N/s), pH of the slurry was 3.5, and the viscosity was 26 mPa·s. When the slurry was put seven days at room temperature, the silica did not precipitate.

Example 8

Regarding the fumed-silica (Aerosil 190), in which the water content was controlled in Example 3, pH was adjusted to 10.3 with potassium hydroxide to measure the dynamic wetting rate. Moreover, the silica slurry having the concentration of 16% was prepared to be measured its viscosity. At this time, the dynamic wetting rate was 11.2 ($\times 10^{-5}$ N/s), pH of the slurry was 10.0, and the viscosity was 12 mPa·s. When the slurry was put seven days at room temperature, the silica did not precipitate.

Comparison Example 1

Regarding a commercial fumed-silica having the specific surface area of 203 m$^2$/g by the BET method (Aerosil 200), the weight loss after drying was 0.28%, and the dynamic wetting rate was 1.65 ($\times 10^{-5}$ N/s). Next, 12 weight % of said silica was added to the pure water to prepare the slurry by stirring to be dispersed. However, the wettability to the water was low, and the silica being in the gel state occurred on the upper area of the side of a container, so that it was difficult to obtain the uniform dispersed liquid. In addition, pH of said dispersed liquid was 4.1. When the dispersed liquid was stirred further by the glass rod to measure the viscosity of the slurry, the viscosity being in the stable state at the shearing rate of 100 s$^{-1}$ was 160 mPa·s. In addition, when said slurry was put seven days at room temperature, the silica layer was separated, and a part of the silica precipitated.

Comparison Example 2

2.0 kg/h of the steam, 87 Nm$^3$/h of the dry air for carrying the silica, and 100 kg/h of the fumed-silica having the specific surface area of 200 m$^2$/g by the BET method (Aerosil 200), were introduced into the pipe kept at 65° C. to be circulated in the pipe until the absorbed water content reached equilibrium. At this time, the relative humidity in the pipe was 10%. Moreover, the weight loss after drying of the fumed-silica prepared by said method was 1.8%, and the dynamic wetting rate was 2.26 ($\times 10^{-5}$ N/s). Next, when 12 weight % of said silica was added to the pure water to prepare the silica slurry by stirring to be dispersed, pH was 4.0. Moreover, when the viscosity of the slurry was measured, the viscosity being in the stable state at the shearing rate of 100 s$^{31\ 1}$ was 98 mPa·s. In addition, when the slurry was put seven days at room temperature, a part of the silica precipitated.

Comparison Example 3

13.5 kg/h of the steam, 87 Nm$^3$/h of the dry air for carrying the silica, and 100 kg/h of the fumed-silica having the specific surface area of 200 m$^2$/g by the BET method (Aerosil 200), were introduced into the pipe kept at 50° C. to be circulated in the pipe until the absorbed water content reached equilibrium. At this time, the relative humidity in the pipe was more than 100%. Moreover, the weight loss after drying of the fumed-silica prepared by said method was 12.8%, and the dynamic wetting rate was 12.6 ($\times 10^{-5}$ N/s). In addition, many white aggregations were observed in said silica. Next, when 12 weight % of said silica was added to the pure water to prepare the silica slurry by stirring to be dispersed, pH was 4.2. Moreover, when the viscosity of the slurry was measured, the viscosity being in the stable state at the shearing rate of 100 s$^{-1}$ was 30 mPa·s. In addition, when the slurry was put seven days at room temperature, the silica precipitated.

Comparison Example 4

6.75 kg/h of the steam, 87 Nm$^3$/h of the dry air for carrying the silica, and 50 kg/h of the fumed-silica having the specific surface area of 86 m$^2$/g by the BET method (Aerosil 90), were introduced into the pipe kept at 40° C. to be circulated in the pipe until the absorbed water content reached equilibrium. At this time, the relative humidity in the pipe was more than 100%. Moreover, the weight loss after drying of the fumed-silica prepared by said method was 12.6%, and the dynamic wetting rate was 16.8 ($\times 10^{-5}$ N/s). In addition, many white aggregations were observed in said silica. Next, when 16 weight % of said silica was added to the pure water to prepare the silica slurry by stirring to be dispersed, pH was 4.3. Moreover, when the viscosity of the slurry was measured, the viscosity being in the stable state at the shearing rate of 100 s$^{-1}$ was 18 mPa·s. In addition, when the slurry was put seven days at room temperature, the silica precipitated.

Comparison Example 5

3.6 kg/h of the steam, 87 Nm$^3$/h of the dry air for carrying the silica, and 200 kg/h of the fumed-silica having the specific surface area of 54 m$^2$/g by the BET method (Aerosil 50), were introduced into the pipe kept at 50° C. to be circulated in the pipe until the absorbed water content reached equilibrium. At this time, the relative humidity in the pipe was 40%. Moreover, the weight loss after drying of the fumed-silica prepared by the method was 1.6%, and the dynamic wetting rate was 3.72 ($\times 10^{-5}$ N/s). In addition, when 20 weight % of said silica was added to the pure water to prepare the silica slurry by stirring to be dispersed, the wettability was low, and the aggregation of the silica was observed on the some places of the liquid interface. At this time, pH of the slurry was 4.6. Moreover, when the viscosity of the slurry was measured, the viscosity being in the stable state at the shearing rate of 100 s$^{-1}$ was 106 mPa·s. In addition, when the slurry was put seven days at room temperature, the silica precipitated.

Comparison Example 6

5.4 kg/h of the steam, 42 Nm$^3$/h of the dry air for carrying the silica, and 250 kg/h of the fumed-silica having the specific surface area of 380 m$^2$/g by the BET method (Aerosil 380), were introduced into the pipe kept at 80° C. to be circulated in the pipe until the absorbed water content reached equilibrium. At this time, the relative humidity in the pipe was 30%. Moreover, the weight loss after drying of the fumed-silica prepared by said method was 2.0%, and the dynamic wetting rate was 2.06 ($\times 10^{-5}$ N/s). In addition, when 12 weight % of said silica was added to the pure water to prepare the silica slurry by stirring to be dispersed, the wettability was low, and the aggregation of the silica was observed on some places of the liquid interface. At this time, pH of the slurry was 4.0. Moreover, when the viscosity of the slurry was measured, the viscosity being in the stable state at the shearing rate of 100 s$^{-1}$ was 260 mPa s. In addition, when said slurry was put seven days at room temperature, the silica did not precipitate.

Comparison Example 7

Regarding the aqueous solution, in which pH of the fumed-silica prepared in Comparison Example 1 (Aerosil 200) was adjusted to 3.2 with nitric acid, the dynamic wetting rate was measured. Moreover, the silica slurry having the concentration of 12% was prepared to be measured its viscosity. The dynamic wetting rate was 2.02 ($\times 10^{-5}$ N/s), pH of the slurry was 3.4, and the viscosity was 110 mPa·s. When the slurry was put seven days at room temperature, the silica precipitated.

Comparison Example 8

Regarding the aqueous solution, in which pH of the fumed-silica prepared in Comparison Example 3 (Aerosil 200) was adjusted to 10.3 with potassium hydroxide, the dynamic wetting rate was measured. Moreover, the silica slurry having the concentration of 10% was prepared to be measured its viscosity. The dynamic wetting rate was 13.8 ($\times 10^{-5}$ N/s), pH of the slurry was 10.1, and the viscosity was 22 mPa·s. When the slurry was put seven days at room temperature, the silica did not precipitate.

TABLE 1

| | Specific Surface Area X ($m^2$/g) | Weight Loss after Drying Y (%) | Dynamic Wetting Rate Z ($10^{-5}$N/s) | Slurry Property | | | Silica Precipitation after seven days |
| --- | --- | --- | --- | --- | --- | --- | --- |
| | | | | Silica Concentration (wt %) | Viscosity (mPa·s) | ph | |
| Example 1 | 200 | 2.6 | 6.20 | 12 | 35 | 4.0 | No |
| Example 2 | 310 | 3.8 | 7.32 | 12 | 42 | 3.9 | No |
| Example 3 | 86 | 4.2 | 9.66 | 16 | 24 | 4.4 | No |
| Example 4 | 200 | 8.6 | 8.72 | 12 | 28 | 4.2 | No |
| Example 5 | 54 | 3.6 | 10.8 | 20 | 28 | 4.6 | No |
| Example 6 | 386 | 4.2 | 5.88 | 12 | 46 | 4.0 | No |
| Example 7 | 200 | 2.6 | 7.43 | 16 | 26 | 3.5 | No |
| Example 8 | 86 | 4.2 | 11.2 | 16 | 12 | 10.2 | No |
| Comparison Example 1 | 203 | 0.28 | 1.65 | 12 | 160 | 4.1 | Yes |
| Comparison Example 2 | 200 | 1.8 | 2.26 | 12 | 98 | 4.0 | Yes |
| Comparison Example 3 | 200 | 12.8 | 12.6 | 12 | 30 | 4.2 | Yes |
| Comparison Example 4 | 86 | 12.6 | 16.8 | 16 | 18 | 4.3 | Yes |
| Comparison Example 5 | 54 | 1.6 | 3.72 | 20 | 106 | 4.6 | No |
| Comparison Example 6 | 380 | 2.0 | 2.06 | 12 | 260 | 4.0 | No |
| Comparison Example 7 | 203 | 0.28 | 2.02 | 12 | 110 | 3.4 | Yes |
| Comparison Example 8 | 200 | 12.8 | 13.8 | 12 | 22 | 10.1 | Yes |

Note:
Specific Surface Area is the value by the BET method.

Obviously, numerous modifications and variations of the present invention are possible in light of the above teachings. It is therefore to be understood that within the scope of the appended claims, the invention may be practiced otherwise than as specifically described herein.

This application is based on Japanese Patent Application Serial No. 2001-400071, filed on Dec. 28, 2001, and incorporated herein by reference.

What is claimed is:

1. A fumed-silica, wherein the % weight loss after drying at 105° C. for 2 hours, Y, of the fumed-silica satisfies the following formula (i):

$$Y \geq 0.0104X - 0.01 \quad (i)$$

wherein $2.6 \leq Y \leq 10$ and wherein the dynamic wetting rate to water, Z ($\times 10^{-5}$N/s), of the fumed-silica satisfies the following formula (ii):

$$Z(\times 10^{-5} \text{ N/s}) \geq - \geq 0.0162X + 9.2 \quad (ii)$$

wherein

X is the specific surface area of the fumed-silica, wherein X is 50-400 $m^2$/g by the BET method.

2. The fumed-silica of claim 1, wherein Y is at most 9.

3. The fumed-silica of claim 1, wherein Y is at most 8.

4. The fumed-silica of claim 1, wherein Y is at most 5.

5. The fumed-silica of claim 1, wherein Y is from 2.6 to 9.

6. The fumed-silica of claim 1, wherein X is 50-200 $m^2$/g.

7. The fumed-silica of claim 1, wherein X is 200-400 $m^2$/g.

8. The fumed-silica of claim 1, wherein Z is 6-12 ($\times 10^{-5}$ N/s).

9. A fumed-silica, wherein the weight loss after drying of the fumed-silica is 2.6% or more and less than 10%, and the dynamic wetting rate to water of the fumed-silica is more than 5 ($\times 10^{-5}$ N/s).

10. The fumed-silica of claim 9, wherein the weight loss after drying is 2.6% or more and less than 9%.

11. The fumed-silica of claim 9, wherein the weight loss after drying is 2.6% or more and less than 8%.

12. A silica slurry containing the fumed-silica of claim 1, wherein the concentration of the silica is more than 10% by weight.

13. The silica slurry of claim 12, wherein, in a standard range of pH and a silica concentration, the viscosity of the slurry at a shearing rate of 100 $s^{-1}$ is less than 50 mPa·s.

14. The silica slurry of claim 12, wherein the silica does not precipitate after seven days at room temperature.

15. A silica slurry containing the fumed-silica of claim 9, wherein the concentration of the silica is more than 10% by weight.

16. The silica slurry of claim 15, wherein, in a standard range of pH and a silica concentration, the viscosity of the slurry at a shearing rate of 100 $s^{-1}$ is less than 50 mPa·s.

17. The silica slurry of claim 15, wherein the silica does not precipitate after seven days at room temperature.

18. A method of preparing the fumed-silica of claim 1, comprising controlling the water content of a fumed-silica such that the % weight loss after drying at 105° C. for 2 hours, Y, of the fumed silica satisfies formula (i), and the dynamic wetting rate to water, Z ($\times 10^{-5}$ N/s), of the fumed silica satisfied formula (ii).

19. A method of preparing the fumed-silica of claim 9, comprising controlling the water content of a fumed-silica such that the weight loss after drying of the fumed-silica is more than 2.6% and less than 10%, and the rate of dynamical wettability to water of the fumed-silica is more than 5 ($\times 10^{-5}$ N/s).

20. A method of preparing the silica slurry of claim 12, comprising combining the fumed-silica with water.

21. A method of preparing the silica slurry of claim 15, comprising combining the fumed-silica with water.

22. A chemical-mechanical polishing, a coating material, a printing ink, an adhesive, a sealant, or an ink-jet recording paper, comprising the fumed-silica of claim 1.

23. A chemical-mechanical polishing, a coating material, a printing ink, an adhesive, a sealant, or an ink-jet recording paper, comprising the fumed-silica of claim 9.

24. The fumed-silica of claim 1, wherein when combined with water to form a silica slurry containing the fumed-silica in a concentration of 20% or less, the silica slurry has a stable viscosity at a shearing rate of 100 $s^{-1}$ at the time of preparation or no precipitation after seven days at room temperature.

* * * * *